US012588696B2

(12) United States Patent
Parcq et al.

(10) Patent No.: US 12,588,696 B2
(45) Date of Patent: Mar. 31, 2026

(54) METHOD FOR ANNEALING PEA STARCH

(71) Applicant: ROQUETTE FRERES, Lestrem (FR)

(72) Inventors: Julien Parcq, Lille (FR); Alban Dupont, Sur la Lys (FR); Marie Albert, Faches-Thumesnil (FR); Fabrice Desailly, Avion (FR)

(73) Assignee: Roquette Freres, Lestrem (FR)

( * ) Notice: Subject to any disclaimer, the term of this patent is extended or adjusted under 35 U.S.C. 154(b) by 880 days.

(21) Appl. No.: 17/756,296

(22) PCT Filed: Nov. 19, 2020

(86) PCT No.: PCT/FR2020/052134
§ 371 (c)(1),
(2) Date: May 20, 2022

(87) PCT Pub. No.: WO2021/099747
PCT Pub. Date: May 27, 2021

(65) Prior Publication Data
US 2022/0408766 A1 Dec. 29, 2022

Related U.S. Application Data

(60) Provisional application No. 62/976,508, filed on Feb. 14, 2020.

(30) Foreign Application Priority Data

Nov. 22, 2019 (FR) ...................................... 1913099

(51) Int. Cl.
*A23L 11/00* (2025.01)
*A23L 29/212* (2016.01)
(Continued)

(52) U.S. Cl.
CPC ............. *A23L 11/05* (2016.08); *A23L 29/212* (2016.08); *A23L 33/30* (2016.08); *C08B 30/12* (2013.01); *A23V 2002/00* (2013.01)

(58) Field of Classification Search
CPC ........ A23L 11/05; A23L 29/212; A23L 33/30; A23L 11/00; A23L 29/30; A23L 33/40;
(Continued)

(56) References Cited

FOREIGN PATENT DOCUMENTS

CN 101096695 B 5/2010
CN 101117352 B 8/2010
(Continued)

OTHER PUBLICATIONS

Lu at el, "Effect of roasted pea flour/starch and encapsulated pea starch incorporation on the in vitro starch digestibility of pea breads", Food Chemistry, vol. 245, p. 71-78 (Year: 2018).*
(Continued)

*Primary Examiner* — Daniel C. McCracken
*Assistant Examiner* — Starfari Teshawn McClain

(57) ABSTRACT

The present invention relates to a method for preparing a legume starch with a high content of slowly digestible fraction (SDS), a hydrothermal treatment method characterized in that it comprises the following steps:
1) Preparing a starch milk with a dry matter content of between 30 and 40% by weight, preferably 32% by weight,
2) Heating the starch milk prepared in this way to a temperature 10 to 15° C. lower than its gelatinization temperature,
3) Stirring the starch milk obtained in this way at this temperature for between 45 minutes and 7 hours, preferably between 1 hour and 6 hours,
4) Recovering, filtering and drying the starch milk treated in this way.

4 Claims, 2 Drawing Sheets

(51) Int. Cl.
     *A23L 33/00*       (2016.01)
     *C08B 30/12*       (2006.01)
(58) Field of Classification Search
     CPC . C08B 30/00; C08B 30/12; A23V 2250/5118;
                A23V 2300/10; A23V 2300/24; A23V
                2300/31; A23V 2002/00; A23V 2300/34
     See application file for complete search history.

(56)             References Cited

FOREIGN PATENT DOCUMENTS

| CN | 103194508 A | * | 7/2013 | |
| CN | 104544473 A | | 4/2015 | |
| WO | WO-2004066955 A2 | * | 8/2004 | ........... A23L 1/0522 |

OTHER PUBLICATIONS

Chung H J et al. "Effect of single and dual hydrothermal treatments on the crystalline structure. thermal properties. and nutritional fractions of pea. lentil. and navy bean starches" Food Research International, Elsevier, Amsterdam, NL, vol. 43, No. 2, Mar. 1, 2010 (Mar. 1, 2010), pp. 501-508, [retrieved on Aug. 6, 2009] DOI: 10.1016/J.FOODRES.2009.07.030 ISSN: 0963-9969, XP026881635.

Chung HJ et al. "Impact of annealing and heat-moisture treatment on rapidly digestible, slowly digestible and resistant starch levels in native and gelatinized corn, pea and lentil starches" Carbohydrate Polymers, Applied Science Publishers, Ltd. Barking, GB, vol. 75, No. 3, Feb. 11, 2009 (Feb. 11, 2009), pp. 436-447, [retrieved on Aug. 14, 2008] DOI: 10.1016/J.CARBPOL.2008.08.006 ISSN: 0144-8617, XP025782302.

Chapter II, entitled "Structure et morphologie du grain d'amidon" ["Structure and morphology of the starch grain"] by S. Perez, in the work 15 "Initiation à la chimie et à la physico-chimie macromoleculaires" ["Introduction to macromolecule chemistry and physical chemistry"], first edition, 2000, vol. 13, pp. 41 to 86, Groupe Français d'Etudes et d'Applications des Perez, Serge & Imberty, Anne. (2002). Structure and Morphology of Starch.

H.N. Englyst and his collaborators (published in 1992 in the European Journal of Clinical Nutrition, vol. 46, pp. S33-S50).

Ratnayake 20 et al., 2002, Pea starch, composition, structure and properties—A review, in Starch/Stärke, 54, 217-234).

Wang et al demonstrated in their 2013 article (published in the review 15 Food Bioprocess Technol, vol. 6, on pp. 3564-3575).

R. Hoover et al. entitled Composition, structure, functionality and chemical modification of legume starches: a review, published in Can. J. Physiol. Pharmacol. 1991,69 pp. 79-92.

H. N. Englyst et al in "Classification and measurement 5 of nutritionally important starch fractions", Eur. J. Clin. Nutr., 46 (Supp. 2), S33-S50 (1992).

Kawanishi-Asaoka et al., "Physicochemical Properties of Various Legume Starches," Applied Glycoscience, vol. 8 No. 4, pp. 307-318, 2018. (Machine-generated English translation included.).

Zhang Erjuan, "Study on the Preparation and Properties of Slowly Digestible Starch," Chinese Master's Theses Full-text Database, Engineering Science and Technology I (Monthly), Issue 03 in 2011, Published during the period from Feb. 16, 2011 to Mar. 15, 2011. (Total 6 pages).

\* cited by examiner

METHOD FOR ANNEALING PEA STARCH

The present invention relates to a hydrothermal method for increasing the content of slowly digestible fraction of pea starch.

It also relates to the pea starch obtained in this way.

FIELD OF THE INVENTION

From a physiological perspective, in humans or animals, the bulk of carbohydrates ingested during eating is represented by starch, an energy reserve molecule that is characteristic of plants and a main component of starchy foods (pasta, flour, potatoes).

During digestion, the starch molecules dissociate into linear glucan chains, themselves dissociated into simple glucose molecules that can be absorbed by the digestive system.

Starch digestion starts in the mouth during mastication by virtue of an enzyme in the saliva: salivary amylase.

This initial breakdown of starch is stopped by the acidity of the stomach but resumes in the duodenum (the first part of the small intestine) by virtue of the action of pancreatic and intestinal amylases.

The successive action of all of these amylases leads to the appearance of a disaccharide, maltose, which itself is converted into two simple sugars, glucoses.

Synthesized biochemically, a source of carbohydrates, starch is one of the most widespread organic materials in the plant kingdom, where it constitutes organisms' nutrient reserves.

It is thus naturally present in the reserve organs and tissues of higher plants, in particular in cereal grains (wheat, corn, etc.), legume grains (peas, beans, etc.), potato or cassava tubers, roots, bulbs, stems and fruit.

Starch is a mixture of two homopolymers, amylose and amylopectin, composed of D-glucose units bonded to one another via $\alpha$-(1-4) and $\alpha$-(1-6) linkages which are the source of branching in the structure of the molecule.

These two homopolymers differ in terms of the degree of branching thereof, and the degree of polymerization thereof.

Amylose is slightly branched with short branches and has a molecular weight between 10,000 and 1,000,000 Dalton. The molecule is formed of 600 to 1,000 glucose molecules.

Amylopectin is a branched molecule with long branches every 24 to 30 glucose units, via $\alpha$-(1-6) linkages. The molecular weight thereof ranges from 1,000,000 to 100,000,000 Dalton and the degree of branching thereof is the order of 5%. The total chain may include 10,000 to 100,000 glucose units.

The ratio of amylose to amylopectin depends on the botanical source of the starch.

Starch is stored in reserve organs and tissues in a granular state, i.e. in the form of semi-crystalline granules.

This semi-crystalline state is essentially due to the amylopectin macromolecules.

In the native state, starch grains have a degree of crystallinity which ranges from 15 to 45% by weight which depends substantially on the botanical origin and on the method used for their extraction.

Granular starch placed under polarized light thus has, in microscopy, a characteristic black cross referred to as "Maltese cross".

This phenomenon of positive birefringence is due to the semi-crystalline organization of the granules: since the average orientation of the polymer chains is radial.

For a more detailed description of granular starch, reference may be made to chapter II, entitled "Structure et morphologie du grain d'amidon" ["*Structure and morphology of the starch grain*"] by S. Perez, in the work "Initiation à la chimie et à la physico-chimie macromoléculaires" ["*Introduction to macromolecule chemistry and physical chemistry*"], first edition, 2000, volume 13, pages 41 to 86, Groupe Français d'Etudes et d'Applications des Polymères [French Polymer Group].

Dry starch contains a water content which ranges from 12 to 20% by weight depending on the botanical origin. This water content obviously depends on the residual moisture of the medium (for aw=1, the starch may fix up to 0.5 g of water per gram of starch).

Heating, with an excess of water, a starch suspension to temperatures close to its gelatinization temperature leads to irreversible swelling of the grains and leads to the dispersion thereof, then the dissolution thereof.

It is these properties in particular which give starch its technological properties of interest.

For a given temperature range, referred to as "gelatinization range", the starch grain will very quickly swell and lose its semi-crystalline structure (loss of birefringence).

All the grains will be as swollen as possible over a temperature range of the order of 5 to 10° C. A paste is obtained composed of swollen grains which constitute the dispersed phase, and molecules (mainly amylose) which thicken the aqueous continuous phase.

The rheological properties of the paste depend on the relative proportion of these two phases and on the swelling volume of the grains. The gelatinization range is variable depending on the botanical origin of the starch.

The maximum viscosity is obtained when the starch paste contains a large number of highly swollen grains. When heating is continued, the grains will burst and the material will disperse into the medium, however dissolution will only occur for temperatures of greater than 100° C.

Amylose-lipid complexes have delayed swelling because the combination prevents the interaction of the amylose with the water molecules, and temperatures of greater than 90° C. are necessary in order to obtain the total swelling of the grains (because the amylomaize is complexed to the lipids).

The disappearance of the grains and the dissolution of the macromolecules leads to a reduction in the viscosity.

Lowering the temperature (by cooling) of the starch paste causes insolubilization of the macromolecules and phase separation due to the incompatibility between amylose and amylopectin, then crystallization of these macromolecules is observed.

This phenomenon is known by the name retrogradation.

When a paste contains amylose, it is this first molecule which will undergo retrogradation.

It will consist in the formation of a double helix and the combination of these double helices to form "crystals" (type B) which will give rise to a three-dimensional network via junction zones.

This network is formed very quickly, in a few hours. During the development of this network, the association of the double helices with one another via hydrogen bonds displaces the water molecules associated with the helices and causes significant syneresis.

The structural complexity of the starch and its physico-chemical properties mean that this class of carbohydrate will be assimilated then digested in a variable way in humans and animals.

This is why starch can be classified into three categories, depending on its digestibility: rapidly digestible, slowly digestible, or non-digestible.

Starch, which occurs in naturally granular/semi-crystalline form, can be converted into "rapidly digestible starch" (RDS) after exposure to heat, pressure and/or moisture during food processes.

Slowly digestible starch (SDS) takes longer to be broken down by digestive enzymes compared to RDS because it still has a crystalline structure and is less accessible to digestion enzymes.

Digestion of this SDS fraction leads to a moderate and regular release of glucose into the blood. These are called starches with low glycemic index ("low G.I.").

Foods with a high SDS content will then cause lower postprandial glycemic responses and lower insulinemic responses than foods only containing a low SDS content.

Conversely, RDSs are nutritious carbohydrates because they release their glucose into the blood much faster.

As for the so-called resistant starches (RS), these are, in turn, comparable to fibers (such as corn bran, oat fibers, gums) which cannot be digested by intestinal enzymes.

It is accepted in the prior art that total starch is the sum of its three components: RDS, SDS and RS.

The different types of starch are therefore digested at different rates in the human digestive system.

It is therefore assumed that SDS has a slower digestion rate than RDS. RS is a fraction of starch that is resistant to enzymatic digestion in the small intestine. This fraction is fermented in the large intestine and can therefore be considered as dietary fiber.

The SDS and RDS fractions are therefore sources of available glucose.

SDSs are naturally present in some uncooked seeds of cereals such as wheat, rice, barley, rye, corn, and in legumes such as peas, field beans and lentils.

The SDS content is mainly influenced by the gelatinization of starch during the food process which will follow.

Indeed, during this process, exposure to temperature, pressure and moisture leads to the conversion of the SDS fraction into RDS, making the starch more accessible to enzymatic digestion.

This conversion can be minimized by controlling the cooking conditions to limit the gelatinization of the starch.

Therefore, the original content of SDS in the composition or the food product will depend on the way in which its preparation has been carried out.

It is therefore known that food products which contain a lot of SDS are certain pastas, parboiled rice, pearl barley and certain cookies, unlike puffed breakfast cereals or bread which usually contain very little.

The SDS content of foods is conventionally determined using an in vitro method developed by H. N. ENGLYST and his collaborators (published in 1992 in the *European Journal of Clinical Nutrition*, volume 46, pages S33-S50).

In the remainder of this presentation, reference will be made to this 1992 method "according to ENGLYST".

This method was developed to simulate the enzymatic digestion that occurs in the small intestine.

A sample of product or starch is introduced into a tube, in the presence of digestive enzymes, and the release of glucose is measured during 120 minutes of reaction.

This method makes it possible to differentiate:

The RDS fraction, by measuring the rapidly available glucose (RAG), in this case, measuring the glucose released between 0 and 20 minutes;

The SDS fraction, by measuring the slowly available glucose (SAG); in this case, measuring the glucose released between 20 and 120 minutes;

The RS fraction corresponding to the glucose not released after 120 minutes, which is calculated, according to the ENGLYST method, by the following formula: TS−(RDS+SDS) where TS=total starch (Total Starch considered equal to 100% when the analyses are carried out on the starch as such).

Foods rich in carbohydrates containing more than 50% by weight of available carbohydrates from starch, of which at least 40% by weight are SDS, are conventionally considered to be foods high in SDS.

They are therefore recommended for limiting the glycemic index and insulin production, compared to foods with a lower SDS content.

Of all the starches conventionally used in these food applications, legume starches, and more particularly pea starch, are a prime candidate.

Indeed, pea seeds are known for their high starch content (between 55 and 70% by weight of dry matter) and for their low glycemic index (Ratnayake et al., 2002, *Pea starch, composition, structure and properties—A review*, in Starch/Stärke, 54, 217-234).

Native pea starches, exhibiting an SDS content conventionally between 27 and 38% by weight according to ENGLYST, are therefore of interest for nutritional applications.

However, in order to prepare foods with high SDS content, it is necessary to use starch with a higher fraction of slowly digestible carbohydrate.

It is known in the prior art that annealing-type heat treatments make it possible to alter the crystal structure of the starch granule.

More particularly, annealing is a term used in polymer science to describe the optimization of the crystallization by heating a polymer to temperatures below their melting point, in order to obtain the growth of crystalline areas, perfection of crystals and a change to more stable crystal structures.

When applied to starch, annealing is defined as a hydrothermal process involving the heating of starch granules in excess water to a temperature greater than the glass transition temperature but lower than the initial gelatinization temperature.

During the annealing process, it is assumed that the starch granules undergo limited but reversible swelling without destroying the granular and molecular structure or the solubilization of the molecules of the starch polymers.

It is generally considered that annealing is associated with the reorganization of the starch chains and amylopectin double helices, which results in increased interactions between the starch chains and an order between the double helices.

The annealing process can significantly modify the physico-chemical properties of the starch granules, although the crystal and molecular orders of the starch granules are not greatly affected.

The physico-chemical modifications generally involve a reduction in the swelling power and the solubility (amylose leaching), a narrowing of the thermal transition range with increased gelatinization and enthalpy change temperatures, increased stability of the adhesive mass and susceptibility to enzymatic digestions.

Certain molecular events, such as the increase in granular stability, the reorganization of the structure of the granules or the reduction in the free energy, were proposed in order to interpret these physico-chemical changes occurring during annealing.

Starch annealing has been the subject of in-depth studies with starches of various botanical sources, such as corn, potato, wheat, rice, sago, sorghum, barley and pea.

Pea starch was assessed positively as it has an amylose content greater than that of numerous other natural starches and it contains a mixture of type A and B polymorphous structures.

Wang et al demonstrated in their 2013 article (published in the review *Food Bioprocess Technol*, vol. 6, on pages 3564-3575) that annealing slightly alters the granular and crystalline structure of the pea starch granules, but modifies the functionality thereof considerably.

Under the conditions used in their study (the annealing temperature was considerably lower than the gelatinization temperature −4° C. for 24 to 72 hours), the annealing induced slight irreversible swelling of the pea starch granules with leaching of certain amylose molecules, although the overall crystallinity was not altered too much.

The authors concluded from this that annealing works principally on the amorphous regions of the starch granules with little effect on the crystalline regions of the starch granule.

However, they demonstrated a polymorphous transition from type A to type B, which was attributed to the filling of double-helix spaces in the type A crystallites with more water molecules induced by the hydrothermal treatment.

The elimination of certain amylose molecules between amylopectin clusters then leads to the weakening of the overall stability of the starch granules, thus resulting in substantial modifications to the functional properties of the annealed starches.

As for the change in the digestibility of the annealed pea starches, the authors demonstrated, using the ENGLYST method (1992) that the enzymatic hydrolysis percentage of pea starch gradually increased over time during a 4-hour incubation.

They thus demonstrated that their annealing treatment increases the in vitro digestibility of pea starch granules.

They concluded that the annealing treatment results in higher RDS contents by reducing RS contents into SDS and then into RDS.

Moreover, this observation is accepted by other authors, the annealing methods conventionally implemented in the prior art therefore having a main objective of making legume starches, and especially pea, more digestible (see the article by CHUNG et al, in *Carbohydrate polymers*, 2009, vol. 75, pages 436-447).

However, contradicting this technical prejudice, the Applicant company has selected to optimize this annealing technology, not to increase the RDS fraction, but to increase the SDS content of legume starch, especially pea starch, by seeking and finding annealing process conditions that are particularly suited to this purpose.

DETAILED DESCRIPTION

Figure 1:
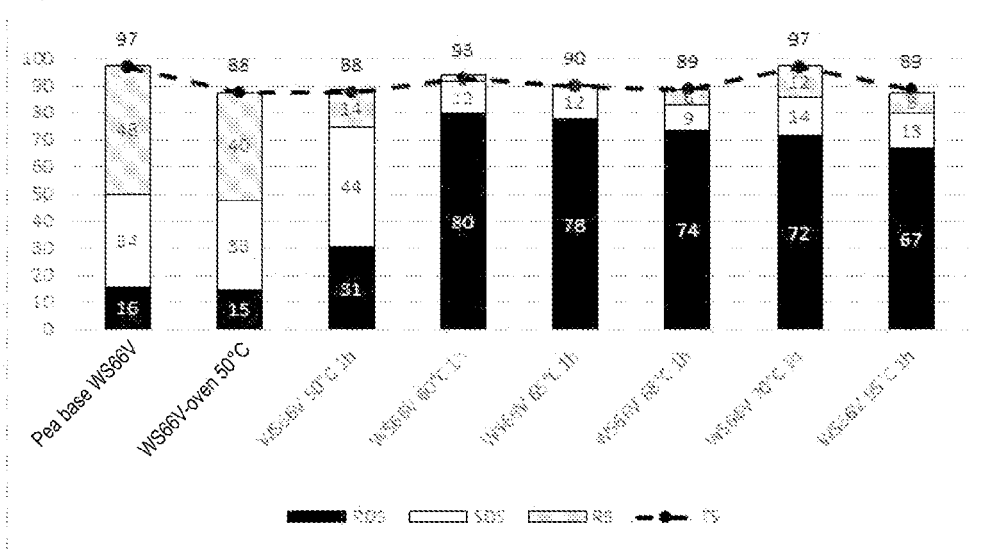
FIG. 1 shows the Englyst digestibility profile (1992), determined at the indicated temperatures.

Thus, the invention relates to a method for preparing a legume starch, preferably pea starch, with a high content of slowly digestible fraction (SDS), a hydrothermal treatment method characterized in that it comprises the following steps:

1) Preparing a starch milk with a dry matter content of between 30 and 40% by weight, preferably 32% by weight, 2) Heating the starch milk prepared in this way to a temperature 10 to 15° C. lower than its gelatinization temperature, 3) Stirring the starch milk obtained in this way at this temperature for between 45 minutes and 7 hours, preferably between 1 hour and 6 hours, 4) Recovering, filtering and drying the starch milk treated in this way.

In the meaning of the present invention, "high content of slowly digestible fraction" is understood to mean an SDS content increase of 10 to 20% by weight, preferably 12 to 17% by weight with respect to the SDS content by weight of the starch from which it is prepared.

For the purposes of the present invention, "legume" means any plant belonging to the families of the cesalpini-aceae, mimosaceae or papilionaceae, and particularly any plant belonging to the family of the papilionaceae, for example pea, bean, broad bean, field bean, lentil, alfalfa, clover or lupin.

The article by R. HOOVER et al. entitled *Composition, structure, functionality and chemical modification of legume starches: a review*, published in *Can. J. Physiol. Pharmacol.* 1991, 69 pages 79-92) especially discloses various legumes in its tables.

Preferably, the legume is selected from the group comprising pea, bean, broad bean and field bean.

Advantageously, it is pea, the term "pea" being considered here in its broadest sense and including in particular:

all the wild varieties of "smooth pea", and all the mutant varieties of "smooth pea" and of "wrinkled pea", regardless of the uses for which said varieties are generally intended (human food, animal feed and/or other uses).

Said mutant varieties are in particular those named "mutants r", "mutants rb", "mutants rug 3", "mutants rug 4", "mutants rug 5" and "mutants lam" as described in the article by C-L HEYDLEY et al. entitled "Developing novel pea starches", Proceedings of the Symposium of the Industrial Biochemistry and Biotechnology Group of the Biochemical Society, 1996, pages 77-87.

According to another advantageous variant, legumes (for example varieties of pea or field bean) are plants giving grains containing at least 25%, preferably at least 40%, by weight of starch (dry/dry).

"Legume starch" is intended to mean any composition extracted, by any means, from a legume and in particular from a papilionaceae, the starch content of which is greater than 40%, preferably greater than 50% and even more preferentially greater than 75%, these percentages being expressed as dry weight relative to the dry weight of said composition.

Advantageously, this starch content is greater than 90% (dry/dry). It may in particular be greater than 95% by weight, including greater than 98% by weight.

"Native" starch means a starch which has not undergone any chemical or enzymatic modification. In a preferred manner, the starch according to the invention is a native starch.

According to one embodiment of the invention, the method does not comprise a step of enzymatic treatment of the starches.

In order to determine their base content of SDS fraction, pea starches, according to the invention or not, are analyzed according to the in vitro digestion process conditions of the method by H. N. Englyst et al in "*Classification and measurement of nutritionally important starch fractions*", Eur. J. Clin. Nutr., 46 (Supp. 2), S33-S50 (1992).

The method consists of measuring the fractions of rapidly digestible starch (RDS), slowly digestible starch (SDS) and non-digestible (resistant) starch (RS) contained in a food.

These fractions are determined after enzymatic digestion with pancreatin, amyloglucosidase and invertase.

The released glucose is measured by colorimetry, using a Glucose GOD FS glucose oxidase kit, referenced 1 2500 99 10 923, marketed by the company DiaSys Distribution France Sari, following the protocol of said kit.

The details of the method implemented to measure digestion according to Englyst are as follows.

Reagents Used:
Anhydrous sodium acetate (ref: 71184, by the company SIGMA)
Benzoic acid (ref: 242381, by the company SIGMA)
$CaCl_2$ (ref: 1.02378.0500, by the company MERCK)
Acetic acid 0.1M (ref: 33209, by the company SIGMA)
Pig pancreatin 8×USP (ref: P 7545 by the company SIGMA)
Amyloglucosidase EC 3.2.1.3 (by the company SIGMA, activity≥260 U/ml/≈300 AGU/ml, Cat. NO. A7095)
Invertase EC 3.2.1.26 (by the company SIMA, activity≥300 units/mg solid, Cat. NO. I-4504)
Guar (ref: G4129, by the company SIGMA)
66% ethanol

Procedure

Preparation of the Saturated Benzoic Acid Solution
Weigh 4 g of benzoic acid in 1 L of reverse osmosis water then mix. The solution can be stored at room temperature for 1 month.

Preparation of 1 M/L $CaCl_2$ Solution.
Weigh 1.1098 g of $CaCl_2$ in 10 ml of reverse osmosis water then mix. The solution can be stored at room temperature for 1 month.

Preparation of 0.1 M Acetate Buffer—pH 5.2.
Weigh 8.203 g of anhydrous sodium acetate in 250 ml of saturated benzoic acid solution,
Add 500 ml of reverse osmosis water then mix,
Adjust the pH to 5.2+/−0.5 using 0.1 M acetic acid,
Top up with the reverse osmosis water to 1000 ml in a graduated flask,
Add 4 ml of the 1 M $CaCl_2$ solution for 1 L of prepared buffer,
Mix and check the pH.
The solution can be stored at 4° C. for 1 month.

Preparation of the Guar Gum Solution in the Acetate Buffer Solution
Weigh exactly 750 mg of guar gum in 300 ml of acetate buffer
Stir continuously Preparation of Samples to be Analyzed and Enzymes Used
Preparation of Samples
Weigh exactly 0.8 g of dry starch to test,
Add 20 ml of 0.1 M acetate buffer solution—pH 5.2+guar gum,
Place the vials in a water bath for 15 minutes while stirring at 37° C.,
Take 0.1 ml of the solution obtained at T=0 minutes then add 0.9 ml of 66% ethanol (i.e. a 1:10 dilution), Glucose assay (as a %) by colorimetry at time T=0 min.
A blank and a standard (Weigh 0.5 g of anhydrous dextrose) are produced under the same conditions as the sample preparation.

Preparation of the Enzyme Cocktail
The enzyme cocktail is intended to test 12 samples. It must be prepared on the same day according to the following protocols.
Preparation of the Pig Pancreatin 8×USP
Prepare 4 solutions of pancreatin in order to obtain 54 ml of supernatant.
To do this:
Weigh 2.5 g of pig pancreatin 8×USP,
Add 20 ml of reverse osmosis water then mix for 10 minutes,
Centrifuge the solution at 1500 g for 10 minutes,
Recover 13.5 ml of supernatant.
Preparation of the Amyloglucosidase
Dilute 3.7 ml of amyloglucosidase solution EC 3.2.1.3 with 4.3 ml of reverse osmosis water then mix for 10 minutes,
Take 6 ml of the new solution then add it to the 54 ml of pancreatic supernatant then mix,
Preparation of the Invertase
Weigh 50 mg of invertase EC 3.2.1.26,
Add 6 ml of reverse osmosis water then mix for 10 minutes,
Take 4 ml of the solution then add it to the 54 ml of pancreatic supernatant then mix.

DIGESTION PROTOCOL

Add 5 ml of enzyme cocktail to the sample preparations
Incubate for 120 minutes at 37° C. in a stirring heat-controlled bath,
Take 0.1 ml of the solution obtained at T=20 min and at T=120 min then add it to 0.9 ml of 66% ethanol (i.e. a 1:10 dilution),
Mix then centrifuge the samples at 1500 g for 3 minutes,
Glucose assay (as a %) by colorimetry at time T=20 min and T=120 min
Determining the free glucose level (Fg) and the total glucose level (Tg)
The free glucose level (FG) corresponds to the measurement performed at time 0 min.
The total glucose level (TG) is measured as follows:
Take 0.25 ml of the solution obtained at T=120 min and place it in an "Eppendorf" type tube,
Add 0.25 ml of 4N hydrochloric acid, mix,
Place the tube in a dry water bath at 100° C. for 45 minutes, allow to cool to room temperature,
Neutralize the hydrolyzed solution with 0.25 ml of 4N soda,
Add 0.25 ml of reverse osmosis water, mix
Make a 1:10 dilution in reverse osmosis water (0.1 ml in 0.9 ml). Namely a 1:40 final dilution.
Determination of the RDS, SDS and RS Levels
Determining the free glucose at different times:
T=0 min (initial glucose content),
T=20 min (free glucose content after 20 minutes) and
T=120 min (free glucose content after 120 minutes).
According to the Englyst method:

$$Glucose\ (\%) = \frac{At \times Vt \times C \times D}{As \times Wt} \times 100$$

Where
    At=Absorbance (sample)−Absorbance (blank)
    Vt=Total volume (sample in ml)
    C=Standard concentration (glucose in mg/ml)
    D=Dilution factor
    As=Absorbance (standard)−Absorbance (blank)
    Wt=Dry weight (sample in mg)
    Where
    At=Absorbance (sample)−Absorbance (blank)
    Vt=Total volume (sample in ml)
    C=Standard concentration (glucose in mg/ml)
    D=Dilution factor
    As=Absorbance (standard)−Absorbance (blank)
    Wt=Dry weight (sample in mg)

The RDS, SDS and RS fractions are determined as follows:

$$RDS=(G20-FG)\times0.9$$

$$SDS=(G120-G20)\times0.9$$

$$RS=((TG-FG)\times0.9)-(RDS+SDS)$$

According to this method, the native pea starch conventionally has an RDS content of between 13 and 16% by weight, an SDS content of between 27 and 38%, and an RS content of between 45 and 56% by weight. These values are given with a standard deviation of +/−2%, given the intrinsic variability during the Englyst enzymatic test.

To increase the SDS level, the annealing method according to the invention, developed by the Applicant company, uses a precise hydrothermal approach.

The invention thus relates to a method for preparing a legume starch, preferably pea starch, with a high content of slowly digestible fraction (SDS), a hydrothermal treatment method characterized in that it comprises the following steps:

1) Preparing a starch milk with a dry matter content of between 30 and 40% by weight, preferably 32% by weight,
    2) Heating the starch milk prepared in this way to a temperature 10 to 15° C. lower than its gelatinization temperature,
    3) Stirring the starch milk obtained in this way at this temperature for between 45 minutes and 7 hours, preferably between 1 hour and 6 hours,
    4) Recovering, filtering and drying the starch milk treated in this way.

The first step of said method in accordance with the invention consists of preparing a legume starch milk, in this particular case of pea, having a dry matter content of between 30 and 40% by weight, preferably 32% by weight.

The second step of the method in accordance with the invention consists of heating the legume starch milk to a temperature 10 to 15° C. lower than its gelatinization temperature, in this particular case for pea starch, to a temperature of between 48 and 53° C., preferably to a temperature of the order of 50° C.

The Applicant company recommends using a heat exchanger, the temperature of which does not exceed 55° C. According to one embodiment of the invention, the method does not comprise a gelatinization step, i.e. the starch milk is never subjected to a temperature greater than or equal to the lowest temperature of the "gelatinization range".

The third step of the method in accordance with the invention consists of maintaining the starch milk at said temperature, whilst stirring, for between 45 minutes and 7 hours, preferably for between 1 h and 6 hours, in an even more preferred manner 1 hour.

The stirring of the reaction medium is adjusted so as to keep the starch in suspension in the reaction medium. This may be obtained by mechanical-type stirring using an anchor, propeller or turbine-type moving body.

The Applicant company has thus found that, contrary to what is recommended in the aforementioned prior art, there is no need to resort to an annealing approach on a starch with high dry matter content (up to 60% by weight of DM is disclosed) at a temperature 10 to 15° C. lower than the gelatinization temperature of the starch for 24 to 72 hours, but rather to favor short times (no more than 6 hours) on a starch with relatively low dry matter content (of the order of 30% by weight).

It is via this approach that it will be possible to increase the SDS level of the treated starch.

The fourth and final step of the method in accordance with the invention thus consists of recovering, filtering and drying the starch milk treated in this way, as exemplified hereinafter.

The residual moisture content of the dry starch obtained is between 10 and 15% by weight, of the order of 13% by weight.

The Englyst digestibility measurement of these products gives SDS values increased by 10 to 20% by weight, preferably 12 to 17% by weight with respect to the initial starch.

As will be shown below, this SDS value for pea starch is above 40% by weight, preferably between 40 and 50% by weight.

These starches with high SDS content will then be advantageously used in fields of application relating to food (intended especially for sportspersons) or medicine (specialist nutrition).

The invention will be better understood on reading the following examples, which are intended to be illustrative, only mentioning certain embodiments and certain advantageous properties according to the invention, and are non-limiting.

Example 1: Determining the Most Effective Conditions for Annealing Pea Starch

In the laboratory, pea starch milk in water at 32% by weight of dry matter is prepared by introducing a native pea starch marketed by the Applicant company under the trade name N735 in demineralized water at room temperature and under gentle stirring.

The temperature of this milk is increased to a value varying from 50° C. to 95° C. (50° C., 60° C., 65° C., 68° C., 70° C. and 80° C.) to study the impact of the heat treatment on the SDS content obtained.

The reaction mixture is stirred for 1 hour at this final temperature.

At the end of this period, the starch milk is recovered, filtered via a sintered glass filter, then dried. It then has a residual moisture content of the order of 13% by weight FIG. 1 presents the Englyst digestibility profile (1992), determined at said temperatures.

It is observed that treatment with an annealing temperature at a value≥60° C. results in an increase in the RDS fraction content, concomitant with the start of the starch gelatinization process.

The treatment at 50° C. results in an increase in the SDS content from the value of 33% by weight for the native pea starch, to a value of 44% by weight for the hydrothermally treated starch, which therefore results in a remarkable increase of 11% by weight.

The amount of water plays an important role, and it is confirmed that the absence of water does not change the digestibility profile of the pea starch in any way.

DSC analyses were also performed on the annealing reaction products at these different temperatures.

TABLE 1

| Sample | treatment type | % moisture by weight | Onset t ° | PEAK t ° | Max. t ° | Enthalpy |
|---|---|---|---|---|---|---|
| Pea Starch | none | 11.9 | 62.5 | 70 | 77.1 | 2.5 |
| Native pea starch (oven 50° C.) | oven | 12.4 | 62.5 | 70.1 | 77.3 | 2.5 |
| 50° C.— - 1 h | Annealing | 9.0 | 67.9 | 72 | 76.8 | 2.5 |
| 60° C. - 1 h | Annealing | 9.8 | 75.2 | 78.1 | 81.4 | 1.8 |
| 65° C. - 1 h | Annealing | 5.1 | 76.8 | 80.7 | 84.3 | 1 |
| 68° C. - 1 h | Annealing | 4.3 | NA | NA | NA | NA |
| 70° C. - 1 h | Annealing | 4.7 | 48.5 | 59.8 | 80 | 1.1 |
| 95° C. - 1 h | Annealing | 6.1 | 51.3 | 63.2 | 72.5 | 1.1 |

No change is observed in the absence of water (control oven at 50° C.).

The annealing treatment demonstrates that treatment at 50° C. for 1 hour is the most effective, with an onset temperature increase of approximately 5° C. after only 1 hour of treatment, a slight increase of the peak t° of +2° C., and practically no change in the max. t°.

The hydrothermal treatment is therefore quick to act on the treated pea starch in milk phase.

Example 2: Optimizing the Increase in SDS Content by Controlling the RDS Fraction to a Value of Less than 35% by Weight The annealing method is maintained as described previously. The temperature is refined with respect to that presented in FIG. 1 so as to refine the range between ~50 and 60° C.

Figure 2:
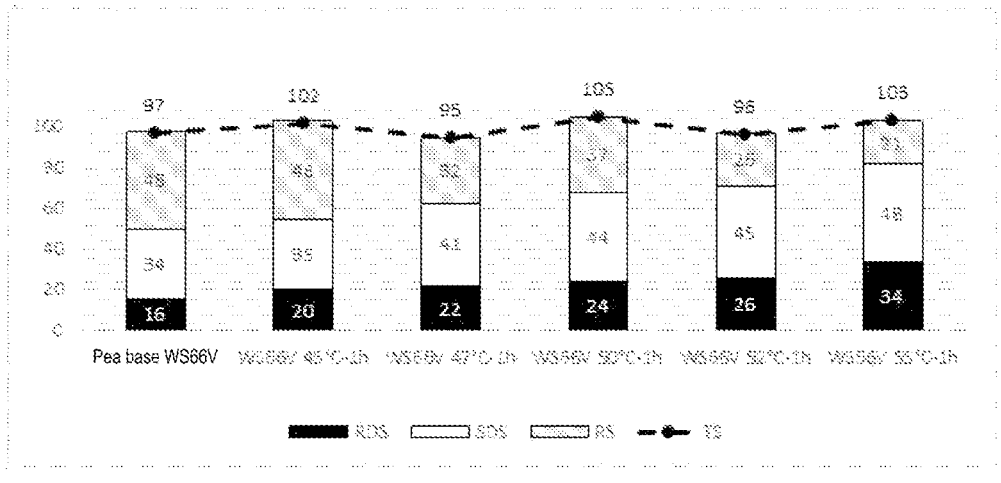
FIG. 2 shows the Englyst digestibility profiles obtained at different temperatures.

FIG. 2 presents the Englyst digestibility profiles obtained at different temperatures.

In this experiment, we observe that it is possible to substantially increase the SDS fraction by controlling the RDS fraction<35% by weight by changing the annealing treatment temperature.

Thus, it can be observed that a temperature of 50° C. is a perfect compromise to master the method whilst making it possible to achieve the target.

Figure 3:
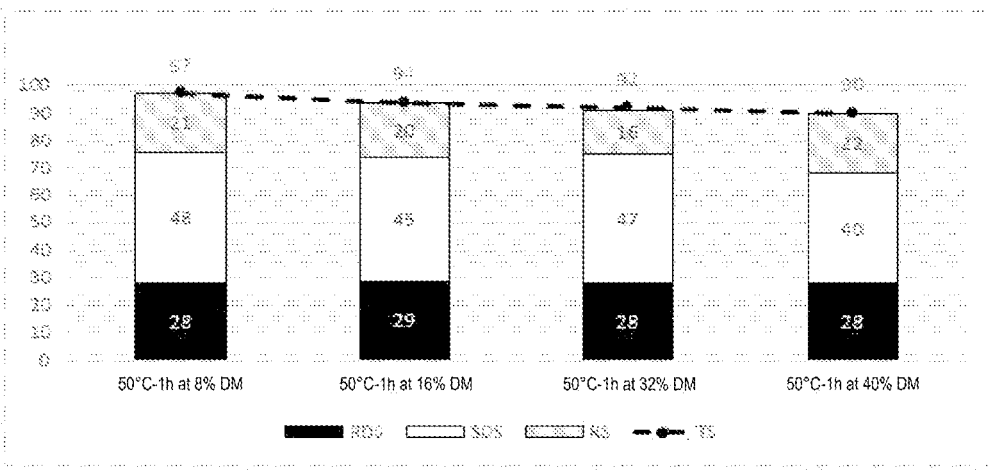
FIG. 3 shows the Englyst digestibility profiles obtained with different dry matter contents.

FIG. 3 presents the Englyst digestibility profiles obtained with different dry matter contents.

It is observed that increasing the amount of dry matter to substantial values reduced the ability to produce a higher SDS fraction.

The annealing temperature is set at 50° C., as explained above.

Table 2 below gives the contents as a percentage by weight of RDS, SDS, RS and TS calculated according to the ENGLYST method.

TABLE 2

| Kinetic point | SC (%) | RDS | SDS | RS | TS (total) |
|---|---|---|---|---|---|
| 20 min H$_2$O 10.6% | 89.4 | 17 | 41 | 41 | 99 |
| 40 min H$_2$O 10.1% | 89.9 | 16 | 41 | 35 | 93 |

TABLE 2-continued

| Kinetic point | SC (%) | RDS | SDS | RS | TS (total) |
|---|---|---|---|---|---|
| 1 h H$_2$O 11.0% | 89.0 | 20 | 42 | 38 | 100 |
| 2 h H$_2$O 10.3% | 89.7 | 19 | 46 | 32 | 96 |
| 3 h H$_2$O 10.2% | 89.8 | 23 | 39 | 39 | 101 |

TABLE 2-continued

| Kinetic point | SC (%) | RDS | SDS | RS | TS (total) |
|---|---|---|---|---|---|
| 4 h H$_2$O 11.0% | 89.0 | 18 | 41 | 47 | 106 |
| 6 h H$_2$O 11.2% | 88.8 | 19 | 40 | 44 | 104 |
| 24 h H$_2$O 10.5% | 89.5 | 20 | 43 | 37 | 100 |
| 48 h H$_2$O 15.7% | 84.3 | 18 | 39 | 40 | 97 |

It can be observed that even after 20 minutes of annealing treatment, the digestibility profile of the pea starch changes.

The best balance is found between 1 and 6 hours of annealing treatment.

By using this method, we are able, as shown below by means of 2 batches of native pea starch, to significantly increase the SDS fraction (+10 to 15% by weight) whilst controlling the increase in the RDS fraction (<35% by weight).

Figure 4:
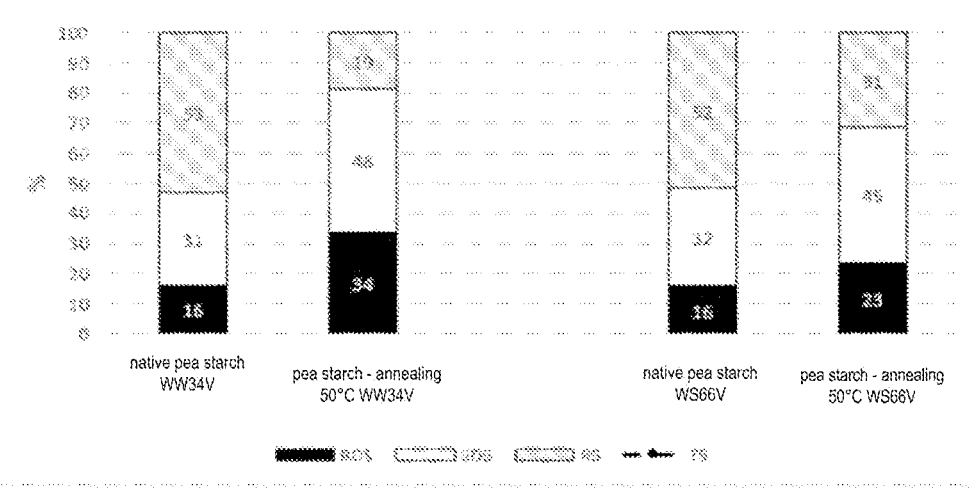
FIG. 4 shows the significant increase in the SDS fraction while controlling the increase in the RDS fraction.

FIG. 4 presents this significant increase in the SDS fraction whilst controlling the increase in the RDS fraction.

The invention claimed is:

1. A method for preparing a legume starch with a high content of slowly digestible fraction (SDS) comprising the following steps:

1) preparing a starch milk with a dry matter content of between 30 and 40% by weight, 2) heating the starch milk prepared in this way to a temperature 10 to 15° C. lower than its gelatinization temperature, 3) stirring the starch milk obtained in this way at this temperature for between 45 minutes and 7 hours, and 4) recovering, filtering and drying the starch milk treated in this way, wherein said method does not comprise a step of enzymatic treatment of the starches.

2. The method according to claim 1, wherein the high content of slowly digestible fraction (SDS) corresponds to an increase of 10 to 20% by weight with respect to the SDS content by weight of the initial starch.

3. The method according to claim 1, wherein for pea starch, the starch milk is heated to a temperature of between 48 and 53° C.

4. The method according to claim 3, wherein the pea starch milk is maintained at this temperature for 1 hour to 6 hours.

* * * * *